United States Patent [19]
Olds et al.

[11] Patent Number: 5,644,572
[45] Date of Patent: Jul. 1, 1997

[54] METHOD AND APPARATUS FOR APPROXIMATING PROPAGATION DELAY FOR USE IN TRANSMISSION COMPENSATION TO ORBITING SATELLITES

[75] Inventors: Keith Andrew Olds; Victor Hawes Cutler, both of Mesa; Daniel Richard Tayloe, Phoenix, all of Ariz.

[73] Assignee: Motorola, Inc., Schaumburg, Ill.

[21] Appl. No.: 538,762

[22] Filed: Oct. 3, 1995

[51] Int. Cl.$^6$ .......................................................... H04J 3/06
[52] U.S. Cl. .......................... 370/324; 455/13.2; 342/357
[58] Field of Search ........................... 455/12.1, 13.2, 455/67.1, 13.1, 67.6; 342/355, 458, 356, 357, 358, 352, 354; 370/104.1, 103, 100.1

[56] References Cited

U.S. PATENT DOCUMENTS

| | | | |
|---|---|---|---|
| 4,901,368 | 2/1990 | Arnold et al. | 455/12.1 |
| 5,446,465 | 8/1995 | Diefer et al. | 342/357 |
| 5,471,648 | 11/1995 | Gourgue | 370/104.1 |

*Primary Examiner*—Douglas W. Olms
*Assistant Examiner*—Ajit Patel
*Attorney, Agent, or Firm*—Kevin K. Johanson

[57] ABSTRACT

A subscriber unit (30) operates in a synchronous communication system having dynamic nodes such as satellites (12). Satellites (12) employ a strict transmit and receive time window and all transmissions directed to satellites (12) must fall within the receive window to be recognized. In a dynamic communication system where low earth orbit satellites (12) continuously orbit, propagation timing between a satellite (12) and a subscriber unit (30) vary rapidly over a wide range. Subscriber unit (30) must approximate a transmit timing advance for use in inaugurating a transmission to satellite (12). Subscriber unit (30) utilizes a valid geolocation position when available but when a position is unavailable or stale, relies on configuration characteristics of the constellation for generating an initial approximation of propagation delay.

17 Claims, 6 Drawing Sheets

METHOD AND APPARATUS FOR APPROXIMATING PROPAGATION DELAY FOR USE IN TRANSMISSION COMPENSATION TO ORBITING SATELLITES

FIELD OF THE INVENTION

The present invention relates generally to wireless communications, and, more particularly, to propagation compensation in a dynamic orbiting wireless communication system.

BACKGROUND OF THE INVENTION

In traditional stationary wireless communication systems, subscriber units synchronize to base stations and continuously track them. In time-domain multiplex systems, transmit and receive timeslots dictate precise time and frequency alignment between a transmitting subscriber unit and a receiving base station. Due to inherent propagation delays between a subscriber unit and a base station, a subscriber unit must develop a transmit time advance offset to compensate for the propagation delay between a subscriber unit and a base station. A precise offset value allows the transmitted information to arrive at the base station during the proper framing or receive window time.

In communication systems where base stations are in substantial motion, such as airborne base stations (e.g., orbiting satellites), the propagation delay between a subscriber unit and an orbiting satellite does not remain constant due to varying distances between a satellite and a subscriber unit. In systems where the base stations are very dynamic, such as with a constellation of low earth orbiting satellites, satellites within communication range of a subscriber unit exhibit a continuously varying propagation delay over a relatively large range of values.

To accommodate a transmission between a subscriber unit and a satellite, a subscriber unit must approximate a transmit time advance to employ when attempting to deliver information to a satellite during a receive window. When nodes in a communication system are static, a subscriber unit may simply maintain a static time advance offset value for repeated use. In terrestrial systems, the range of propagation delay values is necessarily limited by the radio horizon and nominal advance values are adequate, even though some nodes are mobile. However, in a dynamic system where the propagation delay may vary significantly, static values are not effective since large errors in timing may result.

Thus, what is needed is a method and apparatus for approximating a transmit time advance offset so that transmissions are not lost, and are received within the proper window.

DESCRIPTION OF A PREFERRED EMBODIMENT

In a time domain multiplexed communication system where satellite base stations are orbiting, a subscriber unit makes an unassisted estimate of the propagation time and Doppler frequency before it initiates the acquisition process and requests a channel. The acquisition burst should, in the preferred embodiment, arrive within ±2.2 msec of the center of a satellite time slot and the frequency should be accurate to within ±5000 Hz of the channel center frequency at the satellite. Due to the round trip error effect, there is a doubling effect on any error that the subscriber unit makes when it estimates the time and frequency so the subscriber unit estimates should be accurate to ±1.1 ms for propagation delay and ±2500 Hz for Doppler shift.

Estimation of a Doppler frequency is known in the art. A subscriber unit measures the received frequency and compares it to a frequency standard for the applicable channel. The difference is the combination of the Doppler frequency shift, and measurement error and the error in a subscriber frequency reference. As long as the combined reference and measurement error are less than one half of the specified estimation error, a subscriber unit will estimate the Doppler frequency within the specified accuracy. In the preferred embodiment, a 1.5 ppm frequency reference stability is adequate for a subscriber unit.

Estimating the uplink or subscriber unit transmission propagation delay requires additional precision, and in the preferred embodiment, would require an impractical frequency reference. Even if a subscriber unit were required to resynchronize with the system once per day, the time base stability requirement would have to be about 10 ppb to maintain adequate stability for acquisition. Since neither the stability requirement or the resynchronization interval are practical, a subscriber unit should estimate the propagation time without the benefit of a known time frame.

Figure 1:
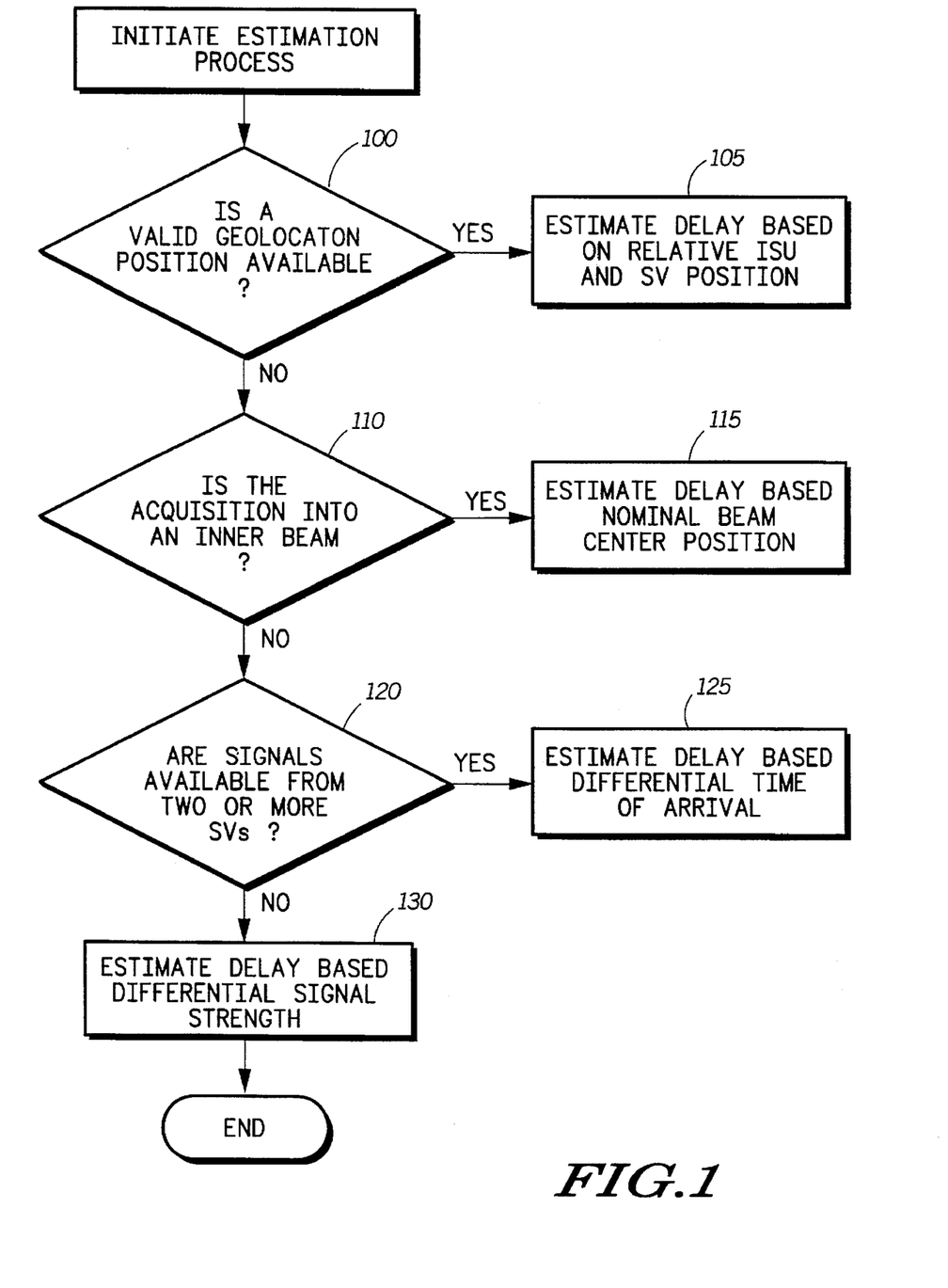
FIG. 1 is a flowchart for estimating a transmit time advance offset from various characteristics of a communication system, in accordance with an embodiment of the present invention.

FIG. 1 is a flowchart for estimating a transmit time advance offset from various characteristics of a communication system, in accordance with an embodiment of the present invention. When a subscriber unit initiates a estimation process for determining a transmit time advance offset, it proceeds through a sequence of decision steps. At each step, a subscriber unit determines if it may make use of a sub-process to estimate propagation delay and therefore generate an offset. If a subscriber unit does not have the information to use a sub-process, the subscriber unit proceeds to a new decision step and evaluates the use of the next sub-process. In the preferred embodiment, the procedures are ordered according to simplicity and reliability so that a subscriber unit preferably uses the least complex and reliable process available under existing conditions.

In the process depicted in FIG. 1, when a subscriber unit decides that an acquisition is necessary, a subscriber unit performs a query task 100 to determine if a subscriber unit possesses a valid geolocation position. A subscriber unit possess a current geolocation value when a recent transmission occurred resulting in a resolution of a location or when a sufficient duration has elapsed causing the subscriber unit to perform an auto-registration process.

If query task 100 determines that a current geolocation value is present, then a subscriber unit performs a task 105. In task 105, a subscriber unit estimates the propagation delay by computing the range between its valid position and a present satellite position, and dividing by the speed of light (see FIG. 2). The satellite position is obtained, in the preferred embodiment, by one of several possible methods. Coordinates identifying a satellite location may be transmitted in the broadcast channel along with beam identifier information, or in a separate independent broadcast channel. Also, since the projection of beams and their nominal beam centers are consistent and known by a subscriber unit, a simple vector computation from a broadcast nominal beam center may produce a sufficiently accurate position of a satellite.

If query task 100 determines a subscriber unit has not recently updated its position and therefore does not possess a current geolocation, then a subscriber unit performs a query task 110. In the preferred embodiment, geolocation data may become stale and invalid after approximately 15 minutes. Also, if a subscriber unit recently became active, then geolocation data may be stale or absent. When location data is stale or absent, then processing passes to query task 110.

In query task 110, a subscriber unit evaluates the characteristics of the current beam servicing a subscriber unit. A satellite transmits a unique broadcast channel in each of the beams of a multi-beam satellite. Within this broadcast channel, a satellite transmits information such a unique beam identifier, and a nominal beam center (i.e., a geographical coordinate defining a reference location within the beam). A subscriber unit, utilizing the beam identifier of the current beam, distinguishes the current beam as either a centrally located beam projected by a satellite nearly straight below the satellite or as a non-centrally located beam emanating more laterally than centrally located beams.

When query task 110 distinguishes the current beam to be a centrally located beam (see FIG. 3), then a task 115 is performed. In task 115, a subscriber unit may either calculate a distance between the satellite and the nominal beam center of the current beam, or a subscriber unit may maintain a table containing the nominal delay to the center of the beam and use that value as the transmit time advance offset. The ground extent of the inner beams is small enough that the delay to the beam center is usually within the 1.1 ms estimate tolerance for any subscriber unit in the beam coverage area of the preferred embodiment.

If the current beam servicing the subscriber unit is an outer beam, the delay to the beam center is presumed to not be an adequate estimate of the propagation delay and processing passes to a query task 120. In query task 120 a subscriber unit attempts to receive transmissions from a different satellite than the one presently transmitting the current beam. If query task 120 acquires this second signal for a second satellite, then a task 125 is performed. In task 125, a subscriber unit estimates a differential time of arrival of the transmitted signals in the current beam with the second transmitted signal from a second satellite. The subscriber unit uses the difference in the time of arrival between the signals from the two satellites to estimate the propagation delay to the desired satellite (see FIG. 4).

A task 130 is performed when query task 120 is unable to detect any transmissions at all, or "usable" transmissions from a second satellite. In task 130, the subscriber unit estimates propagation delay based on the difference in the signal strength between the current beam that a subscriber unit is attempting to acquire and the beam with the next largest signal emanating from the same satellite as the current beam. Such a method is subject to errors due to signal fading, therefore, this approach is less desirable, and hence generally invoked when other circumstances do not lend themselves to the generation of a propagation approximation.

Figure 2:
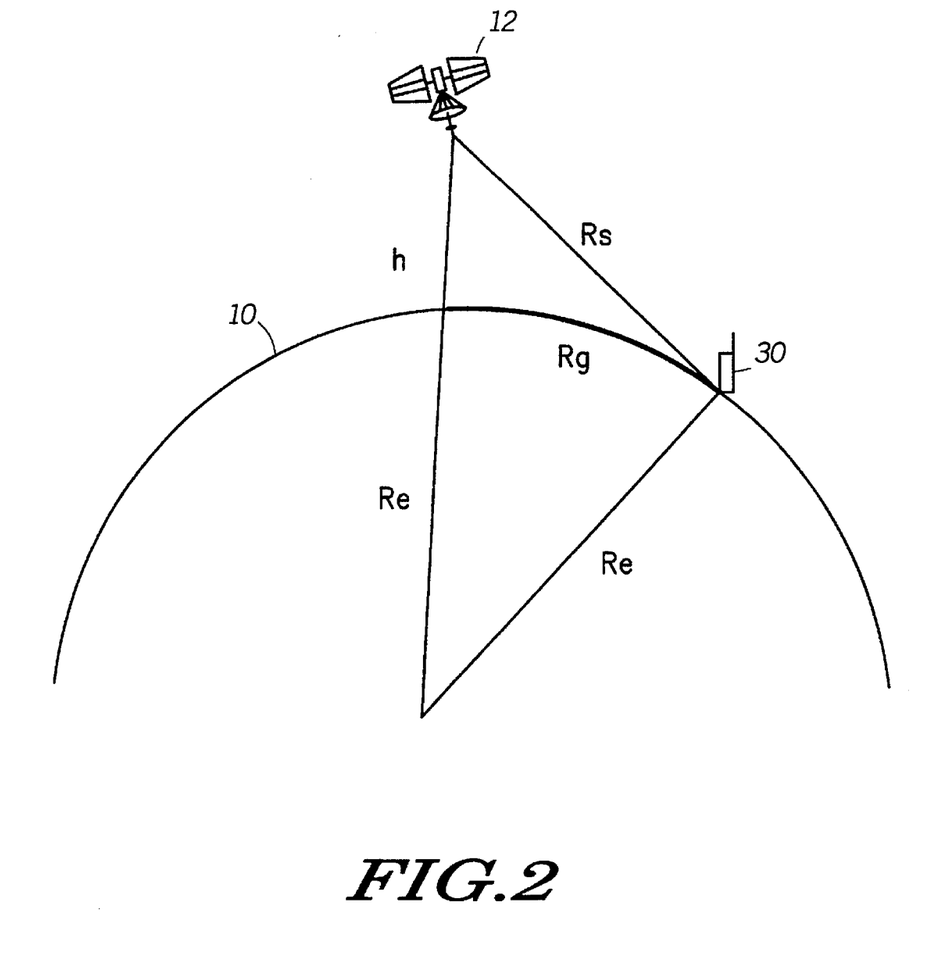
FIG. 2 depicts a simplified geometric representation for calculation of a transmit time advance offset using a known geolocation position of a subscriber unit, in accordance with an embodiment of the present invention.

FIG. 2 depicts a simplified geometric representation for calculation of a transmit time advance offset using a known geolocation position of a subscriber unit, in accordance with an embodiment of the present invention. In the preferred embodiment, geolocation is performed passively, among other things, to conserve spectrum use and power consumption.

The term passive geolocation herein refers to a process that locates a subscriber unit 30 on or near the earth's surface 10 by receiving signals from satellites 12. There is no two-way interaction between satellites 12 and subscriber unit 30. The process of passive geolocation is known in the art with various systems of this kind developed in the past. Perhaps the best known passive geolocation service is global positioning services (GPS) which was developed specifically for this purpose. There have, however been other passive geolocation systems built which use satellites that are available but not specifically designed to support this kind of operation. Some of these systems, for example, achieve sub-meter accuracy using a combination of unrelated satellites.

Passive geolocation processes employ the facts that subscriber units 30 know two fundamental facts about satellites 12. The position of satellites 12 are known with the signal characteristics also known. Fortunately, in the preferred embodiment, these facts are readily available to subscriber unit 30. In the preferred embodiment, signals emanating form satellites 12 occur with a known period, based on a 90 ms downlink frame. Further in the preferred embodiment, subscriber unit 30 is required to make time of arrival, frequency of arrival and received signal strength measurements for other purposes. Any or all of these measurement capabilities may be used in a passive geolocation design.

Passive geolocation systems generally operate using the time of arrival (TOA) and/or frequency of arrival (FOA) of satellite signals. A particularly simple approach is a triangulation system that operates strictly on differential TOA. In the preferred embodiment, a variety of passive geolocation methods may be implemented providing equally as suitable results. A brief description of a triangulation approach is described immediately below.

FIG. 2 illustrates a triangulation process. Subscriber unit 30 receives signals from satellites 12 at four different times, defined as T1 through T4. At each of these times, subscriber unit 30 measures a time of arrival for that particular satellite 12 position. The triangulation processing proceeds as follows.

Defining the following time variables:

$t_i$: The satellite transmit times for i=1 through 4 (unknown)

$\tau_i$: The propagation time for each transmission (unknown)

$T_i$: TOA for each time (unknown)

$\Delta T$: The time between satellite transmissions (unknown)

c: The speed of light

Further suppose that a satellite 12 position at each transmission time ($t_i$) is known at subscriber unit 30. This is accomplished by satellite 12 transmitting its position as data on the signal. Alternately, the system sends subscriber unit 30 the satellite positions, as described above, at a given time and the orbit ephemeris parameters for each satellite. With this data, subscriber unit 30 predicts satellite 12 positions at any future time. In any practical system, of course, satellite orbits vary with time and these parameters require periodic updating. In the preferred embodiment, satellites 12 regularly transmit the center positions of each beam, from which satellite 12 position may be calculated.

Further, let $x_i, y_i, z_i$, be the position of satellite 12 at each transmission time in an arbitrary Cartesian coordinate system. Further, let $x_f, y_f, z_f$ be an unknown subscriber unit 30 position in the same coordinate system. Then, the following relationships hold for the defined system.

$$T_i = t_i + \tau_i$$

$$t_{i+1} = t_i + \Delta T$$

$$(x_f - x_i)^2 + (y_f - y_i)^2 + (z_f - z_i)^2 = (c\tau_i)^2$$

The following set of quadratic equations can be derived from these expressions:

$$(x_f - x_1)^2 + (y_f - y_1)^2 + (z_f - z_1)^2 = [c(T_1 - t_1)]^2$$

$$(x_f - x_2)^2 + (y_f - y_2)^2 + (z_f - z_2)^2 = [c(T_2 - t_1 - \Delta T)]^2$$

$$(x_f - x_3)^2 + (y_f - y_3)^2 + (z_f - z_3)^2 = [c(T_3 - t_1 - 2\Delta T)]^2$$

$$(x_f - x_4)^2 + (y_f - y_4)^2 + (z_f - z_4)^2 = [c(T_4 - t_1 - 2\Delta T)]^2 \quad [1]$$

Note that this is a system of four equations in four unknowns, ($t_1, x_f, y_f, z_f$). It is therefore possible to solve for a subscriber unit 30 position. The system is quadratic, however, so the solution is ambiguous. Some other technique is necessary to break the symmetry of the solutions. In the preferred embodiment, one of two methods are employed to resolve the ambiguity: (i) wait for a second satellite and take a second position fix; and (ii) use the beam ID. The ID of the beam where subscriber unit 30 is located will generally allow rejection of the image position. The beam ID approach may, however, fail near a satellite 12 ground track. In this case, subscriber unit 30 waits until it is able to estimate its position using a different satellite. Using this approach, the real solutions from the two satellites will coincide, but the ambiguous images will not.

Ideally, system [1] defines a set of four spheres that intersect at two points. Frequently in systems, however, the system will be corrupted by measurement errors and noise. In such cases where a simple algebraic method as described provide inconsistent results, a more robust sophisticated statistical approach such as an iterative least square error algorithm may be used by subscriber unit 30.

Design of a particular algorithm for subscriber unit 30 may be provided without undue experimentation by those of ordinary skill in the art. The discussion above shows that a relatively simple procedure can be used to implement the passive geolocation function. In the preferred embodiment, the accuracy required for this function has been set to about 226 km. This relaxed accuracy allows subscriber unit algorithms to be simplified.

Referring to the geometries illustrated in FIG. 2, it can be seen that this accuracy is also adequate for the propagation delay estimation process. The relation between the slant range, $R_s$, and the ground range, $R_g$, is given by the law of cosines as follows:

$$R_s^2 = R_e^2 + (R_e + h)^2 - 2R_e(R_e + h)\cos\left(\frac{R_g}{R_e}\right)$$

Taking the differential of this yields the error relation:

$$dR_s = \frac{(R_e + h)}{R_s} \sin\left(\frac{R_g}{R_e}\right) dR_g \quad [2]$$

The maximum error occurs for the maximum slant range which, in the preferred embodiment, is approximately 2460 km with an associated ground range of 2215 km. Substituting these values into [2] along with 226 km for $dR_g$ yields a slant range error of approximately 224 km. This corresponds to a propagation delay error of about 750 µs. The TOA error at satellite 12 is always twice the error in the subscriber unit 30 estimate, so the TOA error is 1.5 ms. This is well within the 2.2 ms tolerance specified for the acquisition channels.

Figure 3:
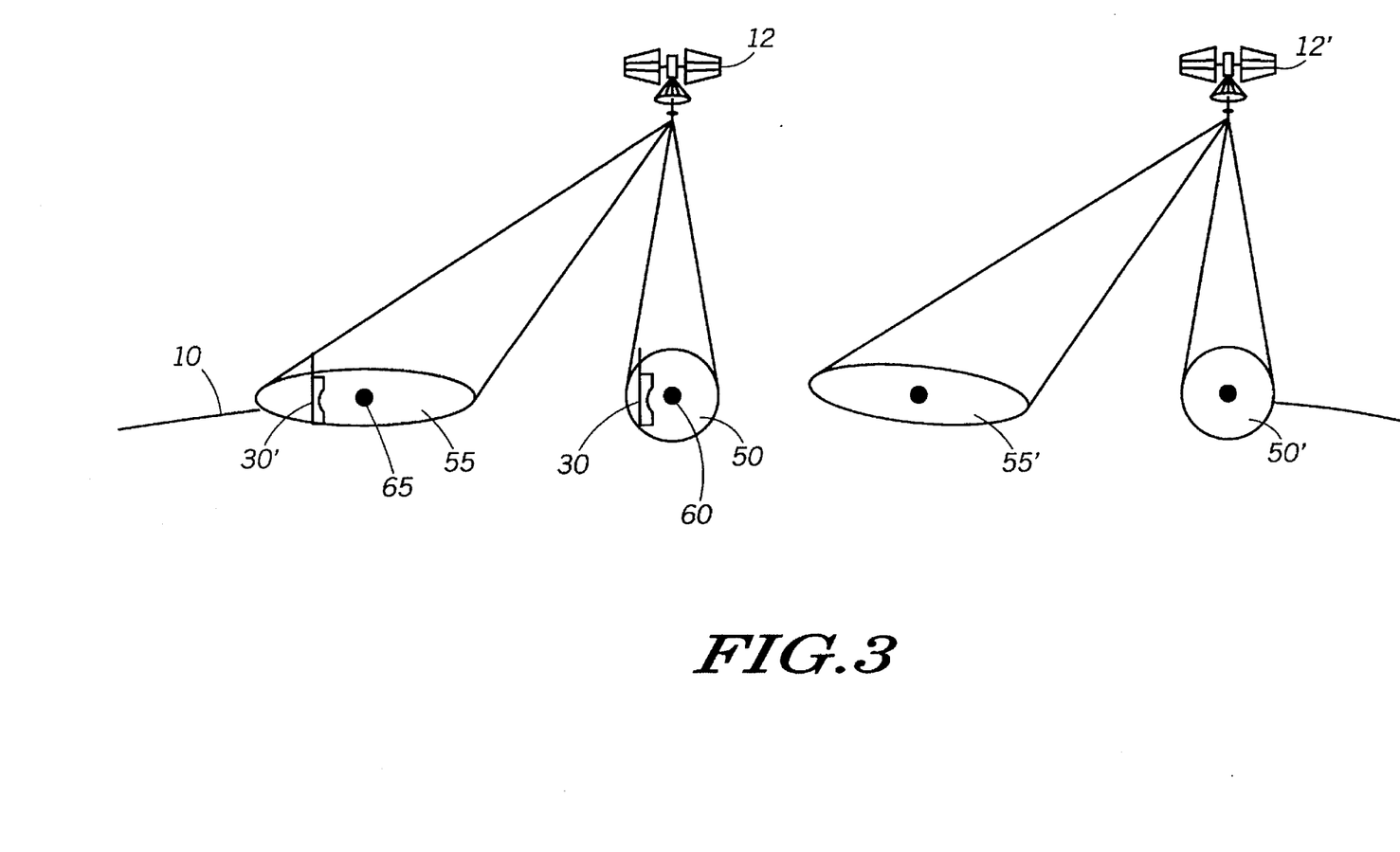
FIG. 3 depicts a simplified geometric representation for generation of a transmit time advance offset using nominal beam centers, in accordance with an embodiment of the present invention.

FIG. 3 depicts a simplified geometric representation for generation of a transmit time advance offset using nominal beam centers, in accordance with an embodiment of the present invention. In general, when nominal beam centers for cells provide a sufficient tolerance for propagation delay calculation, then the distance between a satellite and the nominal beam center are used for generating a transmit time advance offset, that is to say, the delay to the center of a beam is used as the estimate of propagation delay for all points in that beam.

In FIG. 3, satellites 12 and 12' project a plurality of beams upon the earth's surface 10. Beams 50, 55, 50', and 55' are generally spatially and spectrally separated. Spectral separation allows satellites 12 to reuse communication channels in a cellular manner. In the preferred embodiment, satellites 12 transmit a unique broadcast channel transmission into each of beams 50 and 55. This broadcast channel contains information useful to subscriber units 30 contained within the beam and the information may also be used by subscriber units 30 located outside or adjacent to a particular beam.

Broadcast information may contain information regarding available communication channels, access procedure, and in the preferred embodiment, contains a beam identifier distinguishing the present beam from other beams projected by satellite 12. Also, in the preferred embodiment, broadcast information may contain a nominal beam centers 60, and 65 describing a geographic coordinate associated with the present position of beam 50 and 55, respectively. Nominal beam centers 60, and 65 may be used to perform functions such as passive geolocation, registration expiration monitoring, and in the preferred embodiment, nominal beam centers may accommodate propagation delay approximation for subscriber units 30 serviced by beams centrally located about a satellite 12 ground track.

In the preferred embodiment, the specified propagation delay tolerance is about ±2.2 ms, and the error seen at satellite 12 is twice the subscriber unit delay estimation error, this technique is useful while the differential delay across the beam is less than 2.2 ms.

The minimum propagation delay occurs at the satellite ground track point, also known as the sub-satellite point, and is 2.6 ms for a 780 km satellite altitude. Thus, in a satellite footprint comprising a plurality of beams, there are allowable error zones covering delays of 2.6 ms to 4.8 ms, 4.8 ms to 7.0 ms, and 7.0 ms to the edge of coverage where the delay is approximately 8.2 ms.

In FIG. 3 it can be seen that utilization of nominal beam center 60 as an approximation of the location of subscriber unit 30 provides a sufficient approximation for the purposes of calculating a propagation delay to accommodate the specified propagation delay tolerance of ±2.2 ms for the preferred embodiment. However, as the beams are projected more laterally across the earth's surface, and as beam 55 becomes more irregularly shaped and generally elongated, nominal beam center 65 is a less desirable approximation of a default location for subscriber unit 30' and hence an approximated calculation for a propagation delay may not provide the necessary accuracy required for the delay tolerance of ±2.2 ms for the preferred embodiment. An alternate estimation technique is necessary for estimating a propagation delay for subscriber units located outside the centrally located beams projected by satellite 12.

Figure 4:
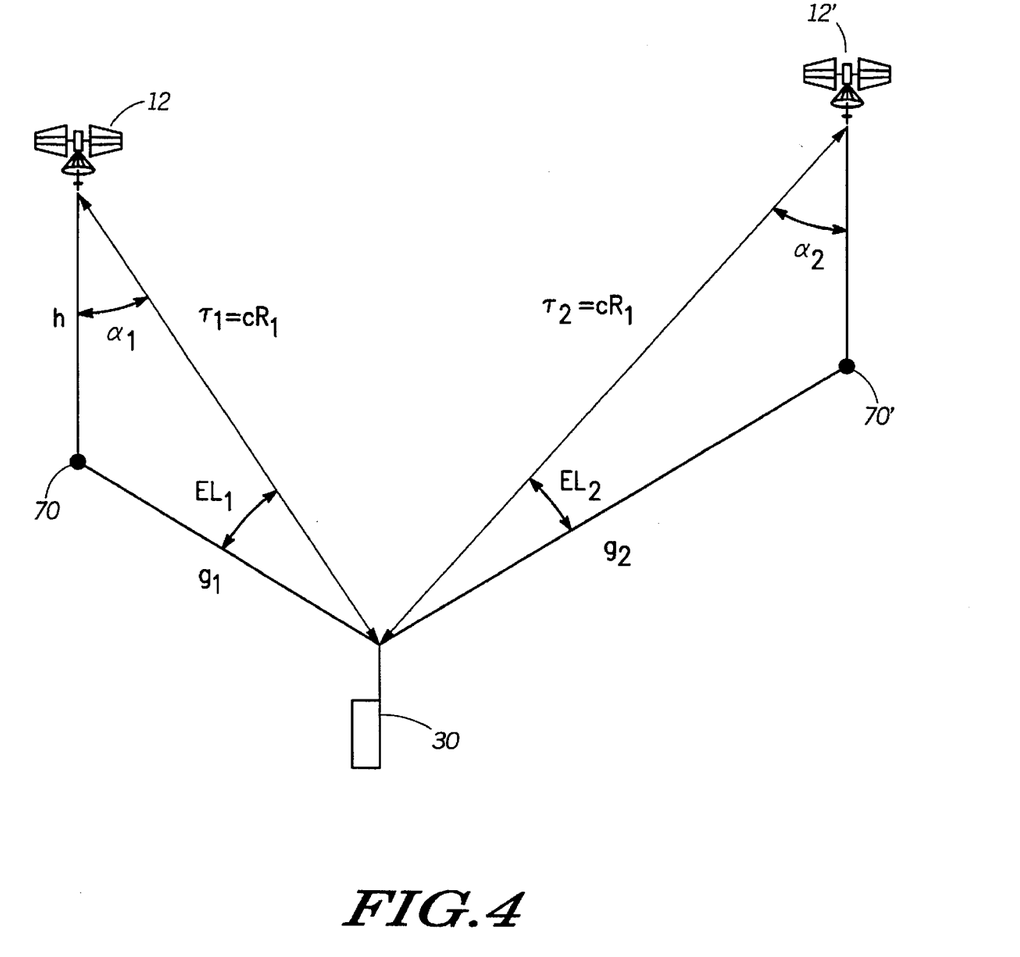
FIG. 4 depicts a simplified geometric representation for generation of a transmit time advance offset using diversity of satellites, in accordance with an embodiment of the present invention.

FIG. 4 depicts a simplified geometric representation for generation of a transmit time advance offset using diversity of satellites, in accordance with an embodiment of the present invention. Subscriber unit 30 rapidly and accurately estimates the delay to a satellite 12 when it receives signals from two of satellites 12. This results, in the preferred embodiment, because all satellites 12 are synchronized to a master frame timing to within ±22.5 µs.

In FIG. 4, subscriber unit 30 measures the time of arrival associated with signals from each of satellites 12 and 12'. Since both satellites 12 and 12' transmit at approximately the same time, the TOAs from each satellite provides the difference in the propagation delays from satellites 12 and 12'. In addition, subscriber unit 30 also receives the nominal beam centers 85, and 95 (see FIG. 5) corresponding to transmission in beams 80, and 90 by satellites 12, and 12', respectively.

It is well known in the art that the time of arrival or propagation delay of a signal from a satellite defines a circle on the surface of the earth centered about a sub-satellite point 70. Further, the differential time of arrival provides the range difference between the two satellites. It is only necessary to make an assumption about the relationship between the two range values in order to estimate the propagation delay.

Figure 5:
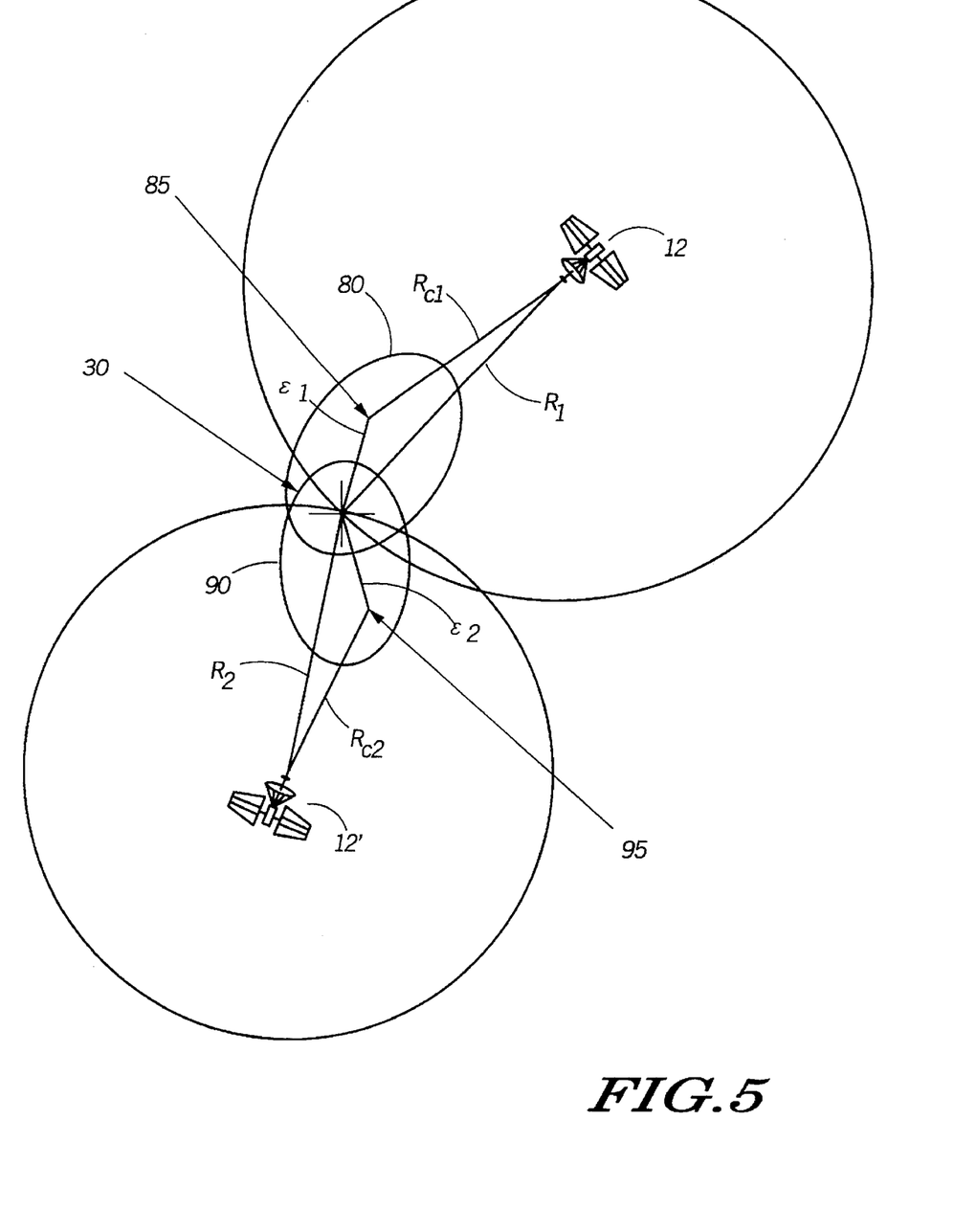
FIG. 5 depicts a graphical orientation of the geometry for determining an approximation of propagation delay using a differential time of arrival calculation, in accordance with a preferred embodiment of the present invention.

FIG. 5 depicts a graphical orientation of the geometry for determining an approximation of propagation delay using a differential time of arrival calculation, in accordance with a preferred embodiment of the present invention. Satellites 12, and 12' transmit in broadcast channels in beams 80, and 90 having ranges R1, and R2, respectively, to subscriber unit 30. Beams 80, and 90 have nominal beam centers 85, and 95 with ranges Rc1, and Rc2 to satellites 12, and 12', respectively. Nominal beam centers 85, and 95 display distances ϵ1, and ϵ2 from nominal beam centers 95, and 85 to subscriber unit 30, respectively.

In calculating an approximation of propagation delay, one particularly simple process results when it is assumed that the ratio of the ranges to satellites 12 and 12' is the same as the ratio to nominal beam centers 85 and 95. This results in the following estimation process.

$$\Delta\tau = (R_1 - R_2)c \quad [3]$$

$$\frac{R_1}{R_2} = \frac{R_{c1}}{R_{c2}} \quad (\text{Assumption})$$

$$\tau_1 = \frac{\Delta\tau}{\frac{R_{c2}}{R_{c1}} - 1}$$

More accurate estimations can be made at the expense of more computational complexity. For example, the law of cosines could be used as follows.

Let:

$\gamma_1$ be the earth central angle between satellite 12 and the subscriber unit 30

$\gamma_{c1}$ be the earth central angle between the satellite 12 and the satellite 12 beam center where the subscriber unit 30 is located $\gamma_2$ be the earth central angle between satellite 12' and the subscriber unit 30

$\gamma_{c2}$ be the earth central angle between the satellite 12' and the satellite 12' beam center where the subscriber unit 30 is located $R_e$ be the radius of the earth $R_h$ be the sum of the earth's radius and the satellite altitude Then, by the law of cosines, the ranges between satellites 12 and 12' and subscriber unit 30 are:

$$R_1 = [R_e^2 + R_h^2 - 2R_e R_h \cos(\gamma_1)]^{1/2}$$

$$R_2 = [R_e^2 + R_h^2 - 2R_e R_h \cos(\gamma_2)]^{1/2} \quad [4]$$

Similarly, the ranges to the nominal beam centers are given by:

$$R_{c1} = [R_e^2 + R_h^2 - 2R_e R_h \cos(\gamma_{c1})]^{1/2}$$

$$R_{c2} = [R_e^2 + R_h^2 - 2R_e R_h \cos(\gamma_{c2})]^{1/2} \quad [5]$$

Assume that the angles between the nominal beam centers and subscriber unit 30 are equal:

$$\Delta\gamma = \gamma_1 - \gamma_{c1} = \gamma_2 - \gamma_{c2}$$

Define:

$$\Delta R_c = R_{c1} - R_{c2}$$

It can then be shown by application of the Taylor series, that:

$$\Delta\tau = \tau_{c1} + \Delta\tau \frac{R_{c1}^2 \sin(\gamma_{c1})}{R_{c1}^2 \sin(\gamma_{c1}) - R_{c2}^2 \sin(\gamma_{c2})} \quad [6]$$

The estimate in [6] is generally somewhat more accurate than the estimate in [3], but requires additional complexity. Other estimate formulations for the two satellite DTOA process can be derived by making other assumptions about the geometric parameters. For the purpose of the rough propagation delay estimate needed for acquisition, however, the simplicity of [3] is very attractive.

The delay estimates given in equations [3] and [6] are particularly simple to compute. These equations, however, cannot be used for cases where the range to the beam centers (or equivalently, the earth center angles) are equal for the two beams involved in the computation. In this case, a more complex set of assumptions must be employed. One such assumption set recognizes that the use of the two satellite delay estimation is generally restricted to situations where both of the beams are outer beams for their respective satellites. This can be seen from the fact that it is preferred that the subscriber unit acquire the nearest satellite and if the subscriber unit is in an inner beam, the table look up approach is normally adequate for delay estimation.

The equal range beam version of the two satellite delay estimate technique relies on the law of sines and the law of cosines along with a series of small angle assumptions.

The law of sines provides the following relationships:

$$\frac{\sin(\alpha_1)}{R_e} = \frac{\sin(\gamma_1)}{R_1} = \frac{\cos(EL_1)}{R_h} \quad [7]$$

$$\frac{\sin(\alpha_2)}{R_e} = \frac{\sin(\gamma_2)}{R_2} = \frac{\cos(EL_2)}{R_h}$$

where $EL_1$ and $EL_2$ are the elevation angles between the subscriber unit and the respective satellites.

For a system of LEO satellites, the earth central angles are always small. In addition, the elevation angles are also small for the outer beams, thus the small angle approximations can be used in equations [4] and [7] to provide the following four expressions:

$$\frac{\gamma_1}{R_1} = \frac{1 - \frac{EL_1^2}{2}}{R_h} \quad [8]$$

$$\frac{\gamma_2}{R_2} = \frac{1 - \frac{EL_2^2}{2}}{R_h}$$

$$R_1^2 = R_e^2 + R_h^2 - 2R_eR_h\left(1 - \frac{\gamma_1^2}{2}\right)$$

$$R_2^2 = R_e^2 + R_h^2 - 2R_eR_h\left(1 - \frac{\gamma_2^2}{2}\right)$$

Equations [8] can be combined with the definition of the differential range:

$$\Delta\tau = c\Delta R = c(R_2 - R_1)$$

to provide the following expression for the delay estimate:

$$\tau_1 = \frac{2}{3}\Delta\tau\left(\frac{R_e}{R_h} - 1\right) + \frac{1}{2}\left\{\frac{16}{9}\Delta\tau^2\left(1 - \frac{R_e}{R_h}\right)^2 - \frac{4}{3}\left[\Delta\tau^2\left(1 - \frac{R_e}{R_h}\right)^2 + \frac{4h^2R_e}{R_h}\right]\right\}^{\frac{1}{2}} \quad [9]$$

Equation [9] is a valid estimate of the propagation delay and may be used for all cases. It is how ever more complex that equations [3] or [6]. So it is reasonable to use these simpler equations if the additional program memory represents a lower cost to the subscriber unit than the additional computational load.

Other propagation delay estimations may be derived from employing differential power measurements. This technique although less desirable, compares the signal strength received from the broadcast or ring alert signals in two different beams. This approach is less attractive than the others, because it is subject to significant errors due to differential fading on the two measurements. Nevertheless, in the preferred embodiment, when parameters for other calculation methods are not present and a rapid estimate is needed in an outer beam with only one satellite in view, this approach will generally provide a sufficiently accurate estimate to enable acquisition.

Since the differential power technique would only be employed when only one satellite is in view, the measurements will all share a common channel. This mitigates the differential fading concern where one transmission from one satellite may have a superior propagation path to a subscriber unit than another. In the preferred embodiment, all broadcast signals are not sent at the same time, so non-simultaneous measurements are necessary and must be accommodated.

Two differential power methods are presented for estimating propagation delay. In one preferred embodiment, the first method compares the difference in power between the received signal in the current beam and the second largest receivable signal in another beam. This approach provides improved delay resolution, but may be susceptible to differential fading.

The accuracy of differential power measurements is degraded by the differential fading encountered in the satellite channel when simultaneous measurements cannot be made. One approach for mitigating the differential fading effect is to average or otherwise statistically characterize the power in the received signals and assess differential power from the power statistics. This approach is effective, but time consuming because it may require a relatively large number of power samples.

In the preferred embodiment, utilizing the geometry of the beams provides an approach that may require fewer samples and therefore allow an estimate to be made more quickly. This approach for the differential power based delay estimate results from the fact that all beams from a given satellite have a fixed geometric relationship. Fundamentally, beams nearer the satellite nadir point overlap the desired beam in areas with less propagation delay than beams farther from the nadir point. Thus, a delay estimate can be made by determining which overlapping beam from the same satellite has the highest power, other than the power from the desired beam, at the subscriber unit's location.

Like the direct measurement of differential power, the choice of which overlapping beam has the highest power can be impaired by differential fading from a first measurement time to a second measurement time. In this case, however, the estimator is using a much less precise relationship than the actual differential power value. Thus, much less averaging or statistical characterization is necessary.

The suggested approach for the highest overlapping beam selection is to take a small number of samples from each beam, for example, 3 to 5 samples. The process should then use only the highest power sample from each beam for the power comparison. Since all beams originate at the same satellite, the only fading is due to multipath fading which is characterized by Ricean or Rayleigh statistics, and rapid fluctuations. These characteristics make it unlikely that all samples of a fundamentally lower power signal will be consistently higher than all samples of a higher power signal. Therefore, this process is able to reliably select the highest overlapping beam even though it cannot determine precisely the specific power difference.

Figure 6:
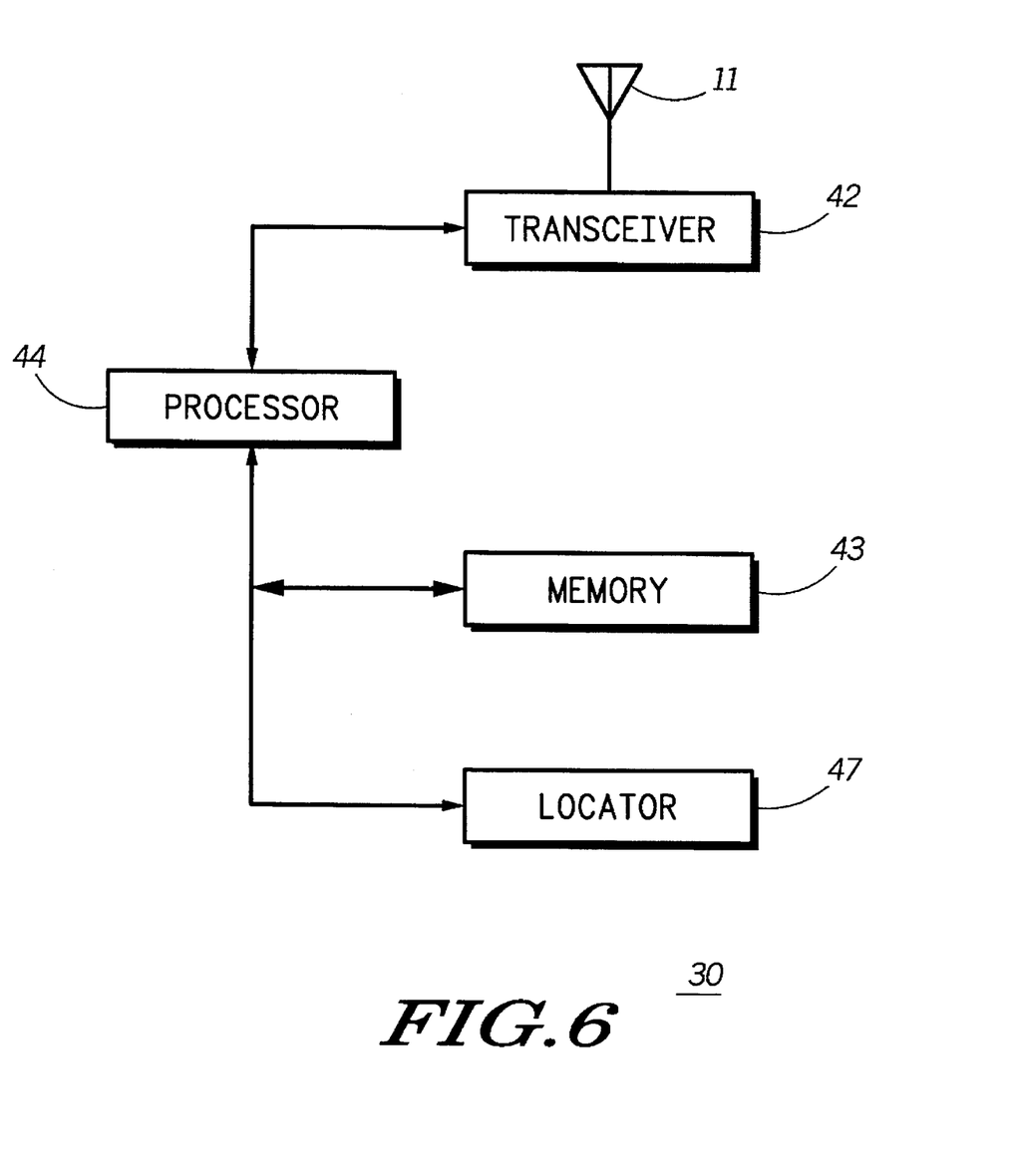
FIG. 6 is a simplified block diagram of a subscriber unit for approximating a transmit time advance offset, in accordance with a preferred embodiment of the present invention.

FIG. 6 is a simplified block diagram of a subscriber unit for approximating a transmit time advance offset, in accordance with the present invention. Subscriber unit 30 includes transceiver 42 which transmits and receives signals to and from satellites 12 and 12' using antenna 11. Transceiver 42 is desirably a multi-channel transceiver capable of transmitting and receiving on all frequency channels in specified time slots as required by satellites 12 and 12'.

Transceiver 42 couples to a processor 44, which controls the frequency, timing, and power parameters upon which transceiver 42 operates. In addition, processor 44 processes, coordinates, and calculates the generation of a transmit time advance offset. Additionally, processor 44 desirably couples to memory 43. Memory 43 includes semiconductor, magnetic, and other storage devices for storing data which serve as instructions to processor 44 and which, when executed by processor 44, cause subscriber unit 30 to carry out procedures which were discussed earlier. In addition, memory 43 includes variables, tables, and databases that are manipulated during the operation of subscriber unit 30.

A locator 47 coupled to processor 44 participates in the generation of a geolocation position of subscriber unit 30. Locator 47 may be a Global Positioning Services type or may be of other types described above or in the art. Locator 47 may store position data internally or may forward such data to processor 44 for storage in memory 43.

This invention allows a subscriber unit to approximate an adequate approximation of propagation timing between a subscriber unit and a satellite. This generation of a transmit time advance offset then enables a subscriber unit to anticipate a receive window at a satellite and then advance in time a transmission allowing it to arrive at a satellite during the proper satellite receive window. When one set of conditions prohibits generation of a propagation delay approximation, then supplementary means are utilized for generating this value.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method in a synchronous communication system for approximating a transmit time advance offset for use by a subscriber unit in transmitting information to a first satellite having a plurality of beams, one of which is a current beam projected about said subscriber unit, said information arriving at said first satellite during a receive window, and said transmit time advance offset corresponding to a propagation delay in said current beam between said subscriber unit and said first satellite, said method comprising the steps of:

when said subscriber unit does not possess a current geolocation position of said subscriber unit, receiving a first transmission from said first satellite, said first transmission in said current beam comprising a first beam identifier and a first beam center defining a first geographical coordinate of an approximated center of said current beam;

determining if said current beam servicing said subscriber unit is a centrally located beam among said plurality of beams of said first satellite;

when said current beam is centrally located among said plurality of beams defining said first beam center as an approximation of a subscriber unit location;

calculating a distance between said first satellite and said subscriber unit, said distance being derived from said subscriber unit location; and estimating said transmit time advance offset from said distance between said first satellite and said subscriber unit.

2. A method as recited in claim 1, further comprising the step of prior to said receiving step, evaluating if said subscriber unit possesses said current geolocation position of said subscriber unit, said current geolocation position defining a subscriber unit location.

3. A method as recited in claim 2, wherein said current geolocation position was determined using a passive geolocation method.

4. A method as recited in claim 3, wherein said subscriber unit employs global positioning services as said passive geolocation method.

5. A method as recited in claim 2, further comprising the steps of:

when said current beam is not a centrally located beam of said first satellite, secondly determining if said subscriber unit can detect a second transmission from a second satellite; and when said subscriber unit detects said second transmission from said second satellite, generating a differential time of arrival between said first transmission from said first satellite and said second transmission from said second satellite, said differential time of arrival defining an approximation of said subscriber unit location.

6. A method as recited in claim 5, further comprising the step of:

when said subscriber unit is unable to detect said second transmission from said second satellite, thirdly determining if said subscriber unit can detect a third transmission from a second beam of said first satellite, said second beam being one of said plurality of beams transmitted by said first satellite; and when said subscriber unit detects said third transmission, generating a differential power level between said first transmission in said current beam and said third transmission in said second beam, both from said first satellite, said differential power level defining an approximation of said subscriber unit location.

7. In a subscriber unit, a method for approximating a transmit time advance offset for use by said subscriber unit in transmitting information to a first satellite, said first satellite having a receive time window wherein said first satellite recognizing said information transmitted by said subscriber unit and said first satellite projecting a plurality of beams upon the earth, said method comprising the steps of:

when said subscriber unit does not possess a current geolocation position of said subscriber unit, receiving in a current beam projected about said subscriber unit a first transmission comprising a first beam identifier and a first beam center, said current beam being one of said plurality of beams projected by said first satellite and said first beam center defining a first geographical coordinate of an approximated center of said current beam;

when said first beam identifier denotes said current beam as being centrally located among said plurality of beams of said first satellite, defining said first beam center as an approximation of a subscriber unit location;

calculating a distance between said first satellite and said subscriber unit, said distance being derived from said subscriber unit location; and estimating said transmit time advance offset from said distance between said first satellite and said subscriber unit.

8. In a subscriber unit, a method as recited in claim 7, further comprising the step of:

when said subscriber unit possesses said current geolocation position of said subscriber unit, prior to said receiving step, retrieving said current geolocation position for use as said subscriber unit location.

9. In a subscriber unit, a method as recited in claim 8, wherein said current geolocation position was determined using a passive geolocation method.

10. In a subscriber unit, a method as recited in claim 9, wherein said subscriber unit employs global positioning services as said passive geolocation method.

11. In a subscriber unit, a method as recited in claim 8, further comprising the steps of:

when said current beam is not a centrally located beam of said plurality of beams of said first satellite and said subscriber unit does not possess said current geolocation position, said subscriber unit attempting to receive a second transmission from a second satellite; and when said subscriber unit receives said second transmission from said second satellite, generating a differential time of arrival between said first transmission from said first satellite and said second transmission from said second satellite, said differential time of arrival defining an approximation of said subscriber unit location.

12. In a subscriber unit, a method as recited in claim 11, further comprising the steps of:

when said subscriber unit is unable to detect said second transmission from said second satellite, determining if said subscriber unit can detect a third transmission from a second beam of said first satellite, said second beam being one of said plurality of beams transmitted by said first satellite; and when said subscriber unit detects said third transmission, generating a differential power level between said first transmission in said current beam and said third transmission in said second beam, both from said first satellite, said differential power level defining an approximation of said subscriber unit location.

13. A subscriber unit for approximating a transmit time advance offset for use by a subscriber unit in transmitting information to a first satellite having a plurality of beams, one of which is a current beam projected about said subscriber unit, said information arriving at said first satellite during a receive window, and said transmit time advance offset corresponding to a propagation delay in said current beam between said subscriber unit and said first satellite, said subscriber unit comprising:

a transceiver for receiving in said current beam a first transmission comprising a first beam identifier and a first beam center, said current beam being one of a plurality of beams projected by said first satellite and said first beam center defining a first geographical coordinate of an approximated center of said current beam said transceiver further employing said transmit time advance offset for transmitting said information to said first satellite during said receive window;

a processor for calculating an approximation of a subscriber unit location, and for estimating said transmit time advance offset from said approximation of said subscriber unit location; and a memory for storing data that serves as instructions to said processor.

14. A subscriber unit as recited in claim 13, further comprising:

a passive geolocation position locator for generating a current geolocation position for said subscriber unit; and said memory further comprising a means for storing said current geolocation position as generated by said passive geolocation position locator.

15. A subscriber unit as recited in claim 14, wherein said passive geolocation position locator is a global positioning services type.

16. A subscriber unit as recited in claim 14, further comprising:

said transceiver further comprising a means for receiving a second transmission from a second satellite; and said processor further comprising a means for generating a differential time of arrival between said first transmission from said first satellite and said second transmission from said second satellite, said differential time of arrival defining an approximation of said subscriber unit location.

17. A subscriber unit as recited in claim 16, further comprising:

said transceiver further comprising a means for receiving a third transmission from a second beam of said first satellite, said second beam being one of said plurality of beams transmitted by said first satellite; and said processor further comprising a means for generating a differential power level between said first transmission in said current beam and said third transmission in said second beam, both from said first satellite, said differential power level defining an approximation of said subscriber unit location.

* * * * *